US011948728B2

(12) United States Patent
Lou et al.

(10) Patent No.: US 11,948,728 B2
(45) Date of Patent: Apr. 2, 2024

(54) BIORTHOGONAL WINDINGS ON TRANSFORMER AND COMMON MODE CHOKE FOR NETWORK PORT

(71) Applicant: CISCO TECHNOLOGY, INC., San Jose, CA (US)

(72) Inventors: Jianquan Lou, Shanghai (CN); Xiaoxia Zhou, Shanghai (CN); Hailong Zhang, Shanghai (CN); Yingchun Shu, Shanghai (CN); Alpesh U. Bhobe, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 146 days.

(21) Appl. No.: 17/192,523

(22) Filed: Mar. 4, 2021

(65) Prior Publication Data

US 2021/0193377 A1 Jun. 24, 2021

Related U.S. Application Data

(62) Division of application No. 15/818,950, filed on Nov. 21, 2017, now Pat. No. 10,971,299.

(51) Int. Cl.

| | |
|---|---|
| ***H01F 27/28*** | (2006.01) |
| ***H01F 27/02*** | (2006.01) |
| ***H01F 27/24*** | (2006.01) |
| ***H01F 27/29*** | (2006.01) |
| ***H01F 27/34*** | (2006.01) |

(Continued)

(52) U.S. Cl.
CPC ........... *H01F 27/34* (2013.01); *H01F 27/027* (2013.01); *H01F 27/24* (2013.01); *H01F 27/28* (2013.01); *H01F 27/29* (2013.01); *H01R 13/719* (2013.01); *H01R 24/64* (2013.01); *H01F 17/062* (2013.01); *H01F 27/2895* (2013.01); *H01R 13/6461* (2013.01); *H01R 13/6633* (2013.01);
(Continued)

(58) Field of Classification Search
CPC ........ H01F 27/34; H01F 27/027; H01F 27/24; H01F 27/28; H01F 27/29; H01F 17/062; H01F 27/2895; H01R 13/719; H01R 24/64; H01R 13/6461; H01R 13/6633; H01R 25/006; H01R 2107/00; H01R 2201/04
See application file for complete search history.

(56) References Cited

U.S. PATENT DOCUMENTS 7,123,117 B2 10/2006 Chen
8,869,383 B2 10/2014 Xu
(Continued)

FOREIGN PATENT DOCUMENTS

CN 202332475 U 7/2012
EP 1884966 A1 2/2008
(Continued)

*Primary Examiner* — Tuyen T Nguyen

(57) ABSTRACT

In one embodiment, an apparatus includes an array of transformers and common mode chokes each comprising a magnetic core and windings wound around the magnetic core at opposing locations on the magnetic core, and a retaining groove on each of the magnetic cores to maintain the windings in their opposing locations on the magnetic core. The transformers and common mode chokes are positioned in the array with the windings on each of the magnetic cores located offset to the windings of adjacent magnetic cores in the array to reduce crosstalk and improve common mode noise rejection.

20 Claims, 8 Drawing Sheets

(51) Int. Cl.

| | |
|---|---|
| ***H01R 13/719*** | (2011.01) |
| ***H01R 24/64*** | (2011.01) |
| *H01F 17/06* | (2006.01) |
| *H01R 13/6461* | (2011.01) |
| *H01R 13/66* | (2006.01) |
| *H01R 25/00* | (2006.01) |
| *H01R 107/00* | (2006.01) |

(52) U.S. Cl.
CPC ........ *H01R 25/006* (2013.01); *H01R 2107/00* (2013.01); *H01R 2201/04* (2013.01)

(56) References Cited

U.S. PATENT DOCUMENTS

| | | | | |
|---|---|---|---|---|
| 2011/0053418 | A1 | 3/2011 | Margulis | |
| 2015/0096168 | A1 | 4/2015 | Itoh | |
| 2016/0064139 | A1 | 3/2016 | Chuang | |
| 2016/0181000 | A1* | 6/2016 | Yen | H01F 27/324 336/220 |
| 2016/0056596 | A1 | 12/2016 | Gao | |

FOREIGN PATENT DOCUMENTS

| | | | | |
|---|---|---|---|---|
| WO | WO2008048669 | A2 | 4/2008 | |
| WO | WO-2016186624 | A1 * | 11/2016 | E21B 47/00 |

* cited by examiner

BIORTHOGONAL WINDINGS ON TRANSFORMER AND COMMON MODE CHOKE FOR NETWORK PORT

STATEMENT OF RELATED APPLICATION

The present application is a divisional of U.S. patent application Ser. No. 15/818,950, filed Nov. 21, 2017, the contents of which are incorporated by reference herein for all purposes.

TECHNICAL FIELD

The present disclosure relates generally to magnetic components, and more particularly to a transformer and common mode choke for a network port.

BACKGROUND

Transformers and common mode chokes are used together at network interfaces between network cables and electronic devices to provide isolation and common mode noise suppression. The transformer electromagnetically couples signals from a primary side to a secondary side. Due to EMI (electromagnetic interference) concerns, the transformer is often coupled with a common mode choke (CMC). The common mode choke allows data signals to pass through unimpeded while presenting high impedance to common mode signals and noise, thereby removing high frequency noises.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
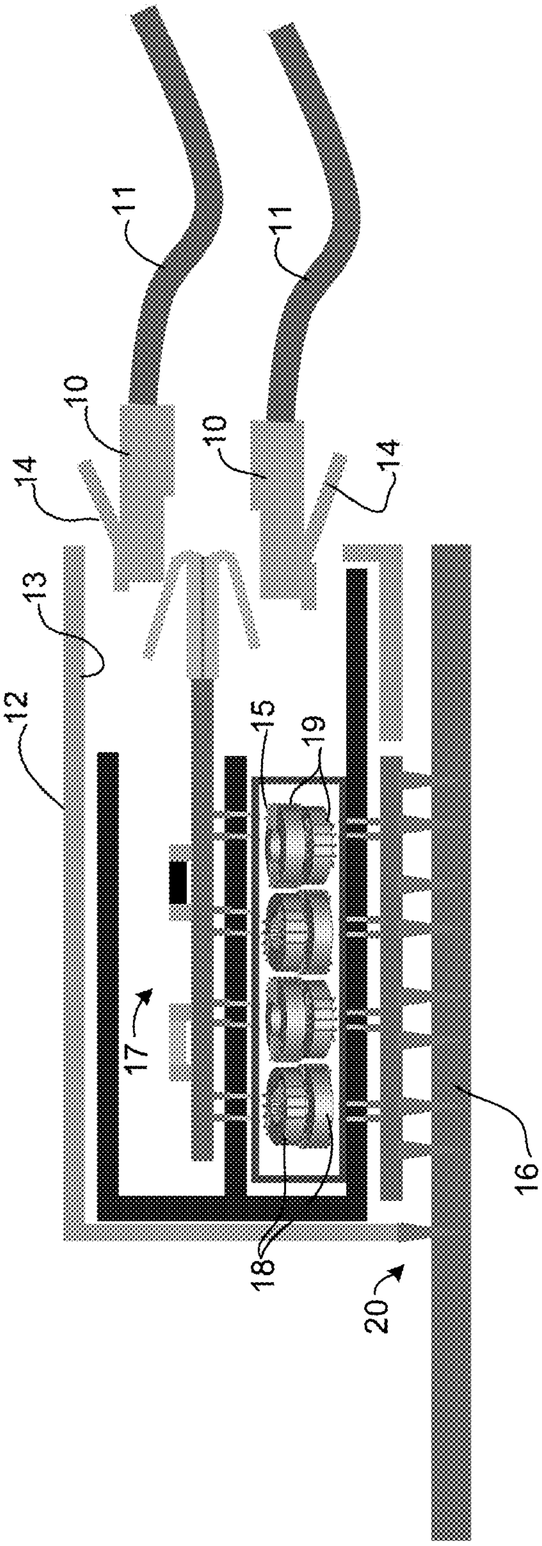
FIG. 1 is cross-sectional view of an integrated connector module with a transformer and common mode choke array, in accordance with one embodiment.

In one embodiment, an apparatus generally comprises a plurality of transformers and a plurality of common mode chokes, each of the transformers and the common mode chokes comprising a magnetic core and windings wound around the magnetic core at generally opposite sides thereof. The transformers and common mode chokes are arranged in an array with the windings on each of the magnetic cores positioned generally orthogonal to the windings of adjacent magnetic cores in the array to reduce crosstalk and improve common mode noise rejection.

In another embodiment, an apparatus generally comprises an array of transformers and common mode chokes each comprising a magnetic core and windings wound around the magnetic core at opposing locations on the magnetic core, and a retaining groove on each of the magnetic cores to maintain the windings in their opposing locations on the magnetic core. The transformers and common mode chokes are positioned in the array with the windings on each of the magnetic cores located generally orthogonal to the windings of adjacent magnetic cores in the array to reduce crosstalk and improve common mode noise rejection.

In yet another embodiment, an apparatus generally comprises a connector for receiving a plurality of network communications cables, the connector comprising a plurality of transformers and a plurality of common mode chokes, each of the transformers and the common mode chokes comprising a magnetic core and windings wound around the magnetic core at generally opposite sides thereof. The apparatus further comprises a processor for processing data received from the connector. The transformers and common mode chokes are arranged in an array with the windings on each of the magnetic cores positioned generally orthogonal to the windings of adjacent magnetic cores to reduce electromagnetic interference in the array.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Transformers and common mode chokes are often used together in network ports and may be integrated into a network connector or packaged together as a discrete component. Both configurations require the transformers and common mode chokes to be positioned close together due to limited space availability. Conventional systems are configured with windings (coils) of the transformer and common mode choke mostly distributed around the entire circumference of a toroidal magnetic core. This winding configuration makes the coils close to each other in one stack or between stacks of transformers and common mode chokes, which increases the coupling between the coils and may cause Electromagnetic Interference (EMI) and Signal Interference (SI) problems, which can corrupt information, causing equipment to lose performance, malfunction, or fail.

These problems may be addressed by adding extra ferrite core on a network cable or a ferrite bead in a PCB (Printed Circuit Board) to increase common mode noise suppression, or digital signal processing technology may be introduced to increase Signal-to-Noise Ratio (SNR) to mitigate problems caused by crosstalk. However, these fixes result in a need for additional resources and the changes needed to reduce EMI to acceptable levels will increase labor and material costs and may cause degradation to other electrical performance parameters, which can compromise signal integrity.

The embodiments described herein include biorthogonal windings for transformers and common mode chokes for a network port to minimize coupling between coils and thereby enhance common mode noise rejection and reduce crosstalk. As described in detail below, the biorthogonal winding is orthogonal to adjacent windings between adjacent transformers and common mode chokes.

Referring now to the drawings, and first to FIG. 1, an example of a cable assembly comprising a plug (male connector) 10 and cable 11 coupled to an Integrated Connector Module (ICM) (port, jack, receptacle, receiver, female connector, Ethernet receptacle) 12 is shown. The ICM 12 includes a housing with the receptacles on one face and connections to a PCB (printed circuit board) 16 on another side. The ICM 12 may be used for connecting communications equipment through cables 11 in a data communications network, for example. The ICM 12 may include any number of ports each comprising a receptacle (cavity, opening) 13 formed in a body of the ICM for receiving a free end of the plug 10. As shown in the example of FIG. 1, the plug 10 may include a resilient tab 14 configured to rest against an inner surface of the ICM port to lock the plug in place.

The ICM 12 comprises a transformer and common mode choke array 15 coupled to the PCB 16. The connector 12 may be mounted onto the PCB 16 using any suitable connection means, generally indicated at 20. The PCB 16 may include, for example, a plurality of conductive pads with coil wires from the transformer and common mode choke array 15 soldered thereto. The connector 12 may further include a Bob Smith Termination (BST), generally indicated at 17, or any other circuit providing common mode termination of wires.

The ICM 12 is operable to remove common mode noise using the common mode choke and magnetically isolate signal wires using the transformer. The term "noise" as used herein may refer to any undesired signal component that is present in the circuit, including, for example, any discrepancy between an average of two differential signals and a reference voltage.

In one example, the transformer and common mode choke array 15 comprises two rows of transformers and common mode chokes stacked vertically, as shown in FIG. 1. In this example, each network port has four signal pairs and each signal pair has one transformer and one common mode choke. Thus, four, two row stacks of transformers and common mode chokes are placed inside of the connector for one port and need to be placed close to one another due to space limitations.

Each transformer and common mode choke within the array 15 comprises a magnetic core 18 and windings (coils) 19 wound on generally opposite sides of the magnetic core. As described in detail below, the transformers and common mode chokes are arranged in the array 15 with the windings 19 on each of the magnetic cores 18 positioned generally orthogonal to the windings of adjacent cores in the array to minimize coupling between the coils thereby enhancing common mode noise rejection and reducing crosstalk (reducing EMI).

Figure 2A:
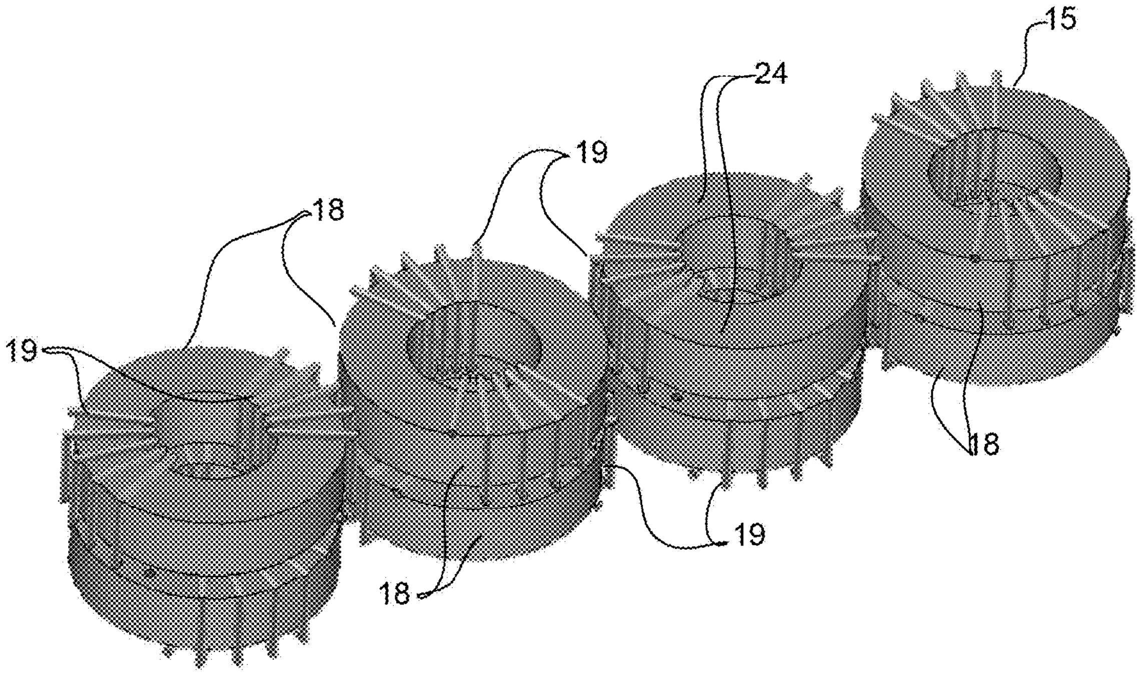
FIG. 2A is a perspective of the transformer and common mode choke array of FIG. 1 with toroidal cores.

FIG. 2A is an enlarged perspective of the transformer and common mode choke array 15 of FIG. 1. As previously noted, the transformer and common mode choke array 15 comprises a plurality or transformer and common mode choke assemblies each comprising a magnetic core 18 and windings 19 (insulated wire wound on core). The windings 19 may include, for example, primary and secondary windings disposed at diametrically opposed locations across the core (i.e., generally opposite sides of the core) or two winding groups each comprising both primary and secondary windings, with the two groups located on opposite sides of the core. Thus, there are two angular sections 24 of the core 18 that contain no windings, and the two windings 19 are spaced from one another moving circumferentially around the core. In the example shown in FIG. 2A, the coils are wound over two sections, each section having an angular width of less than ninety degrees.

As shown in FIG. 2A, each core and coil assembly is positioned such that the respective windings 19 are located generally orthogonal to each adjacent winding. The windings 19 within the array are referred to herein as biorthogonal windings, since each of the two windings on the core 18 is positioned generally orthogonal to the windings on an adjacent core in the same plane or an adjacent core stacked vertically above or below the core and coil assembly. In one example, each stack (i.e., one of the four stacks shown in FIG. 2A) comprises a common mode choke positioned over a transformer.

In the example shown in FIGS. 1 and 2A the array 15 comprises toroidal cores 18. The cores may also be rectangular (e.g., square) as shown in the transformer and common mode choke array 25 of FIG. 2B. Each core 28 comprises four sides with only two opposing sides having coils 29 wound thereon. The two remaining sides are bare (i.e., have no windings). The windings 29 are located on opposite sides of the cores 28, with the cores positioned such that the windings are generally orthogonal to one another on adjacent cores in the same plane or an adjacent core stacked vertically above or below the core.

Referring again to FIG. 1, the ICM 12 may comprise, for example, an RJ45 network connector that has a LAN (Local Area Network) magnetic interface circuit and common mode termination components for each port integrated into the connector housing to form a functional unit. In another embodiment, the transformer and common mode choke array may be packaged together as a discrete component, as shown in FIG. 3, and placed on a PCB for the network port.

Figure 3:
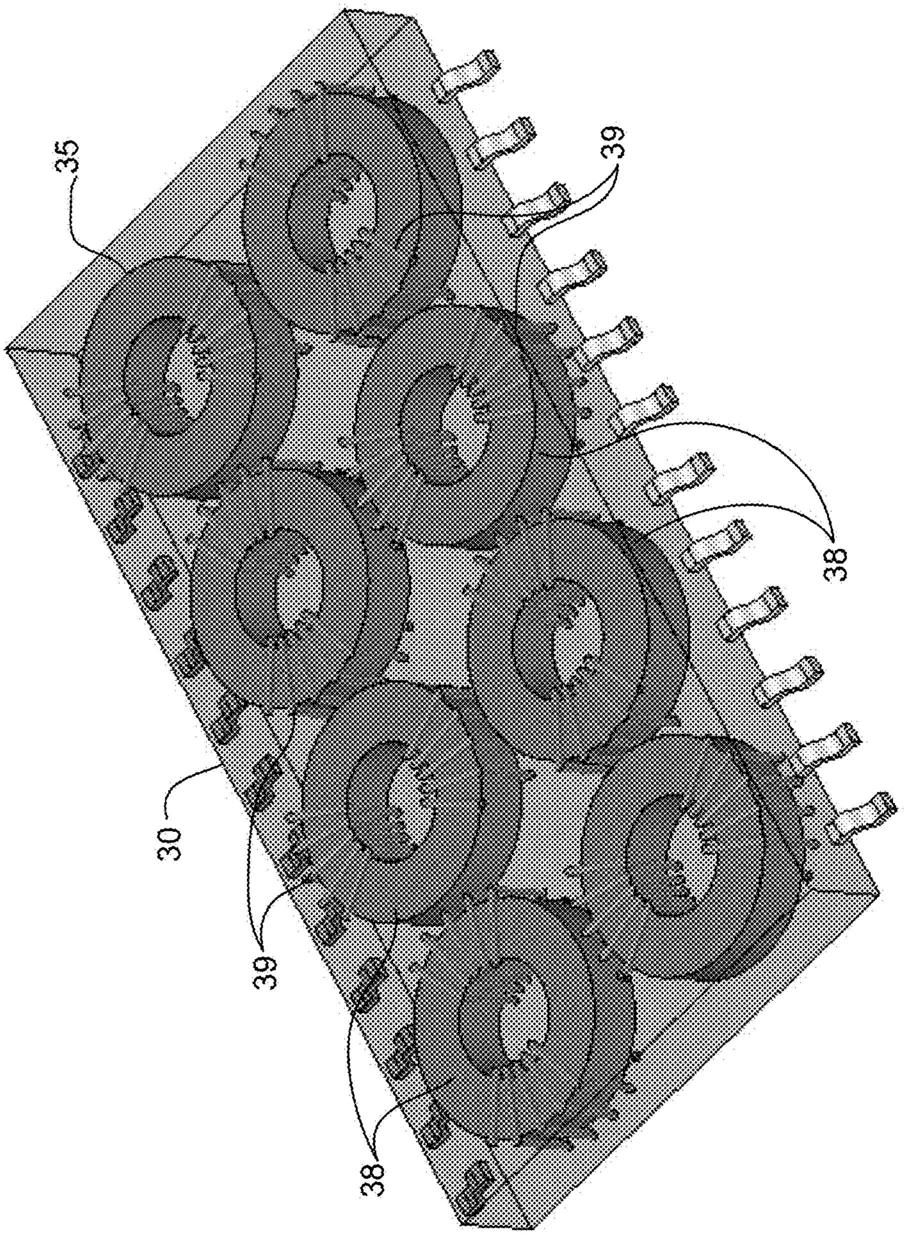
FIG. 3 is a perspective showing internal components in a LAN (Local Area Network) magnetics module, in accordance with one embodiment.

FIG. 3 shows a transformer and common mode choke array 35 packaged together as a discrete component referred to as a LAN (Local Area Network) magnetic device (module, circuit, component) 30. Each signal pair has one transformer and one common mode choke, which cascade together as one group. The array 35 comprises a plurality of transformers and common mode chokes, each comprising a magnetic core 38 and a pair of windings 39 wound around the core at generally opposite sides thereof.

Figure 4A:
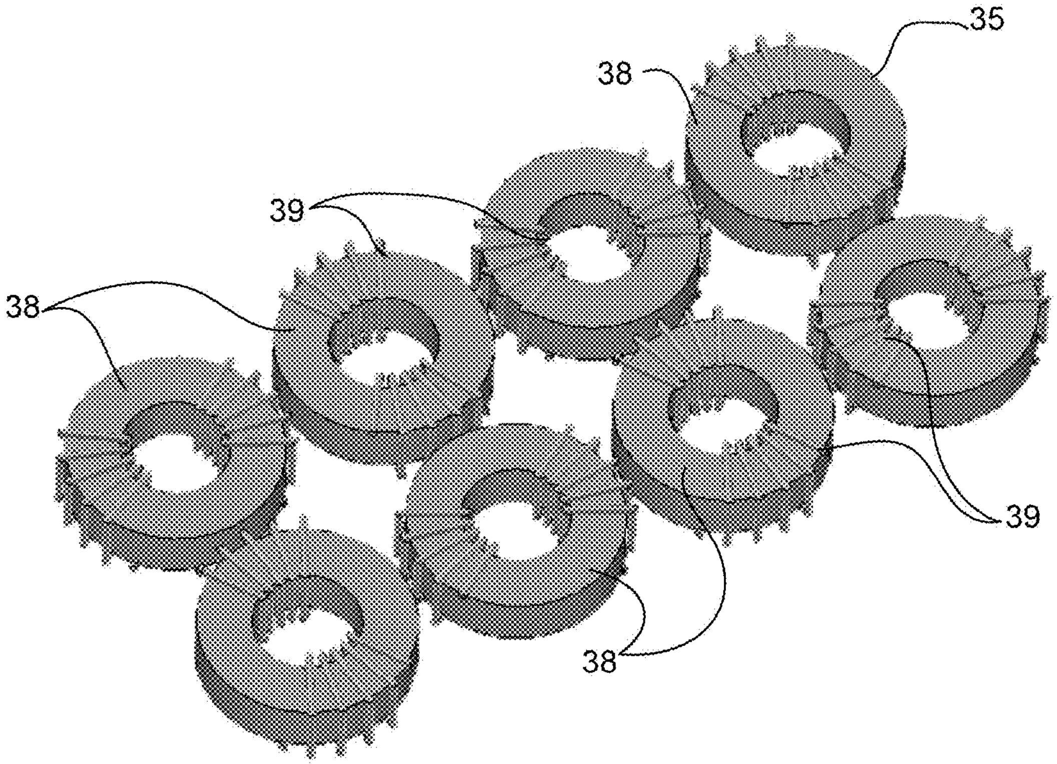
FIG. 4A is a perspective of a transformer and common mode choke array of FIG. 3 with toroidal cores.

FIG. 4A is a perspective of the transformer and common mode choke array 35 of FIG. 3, which comprises a plurality or transformers and common mode choke assemblies each comprising a magnetic core 38 and windings (coil, insulated wire wound on core) 39. Each core and winding assembly is positioned such that the respective windings 39 are located generally orthogonal to windings on adjacent cores, as previously described with respect to FIG. 2A.

Figure 4B:
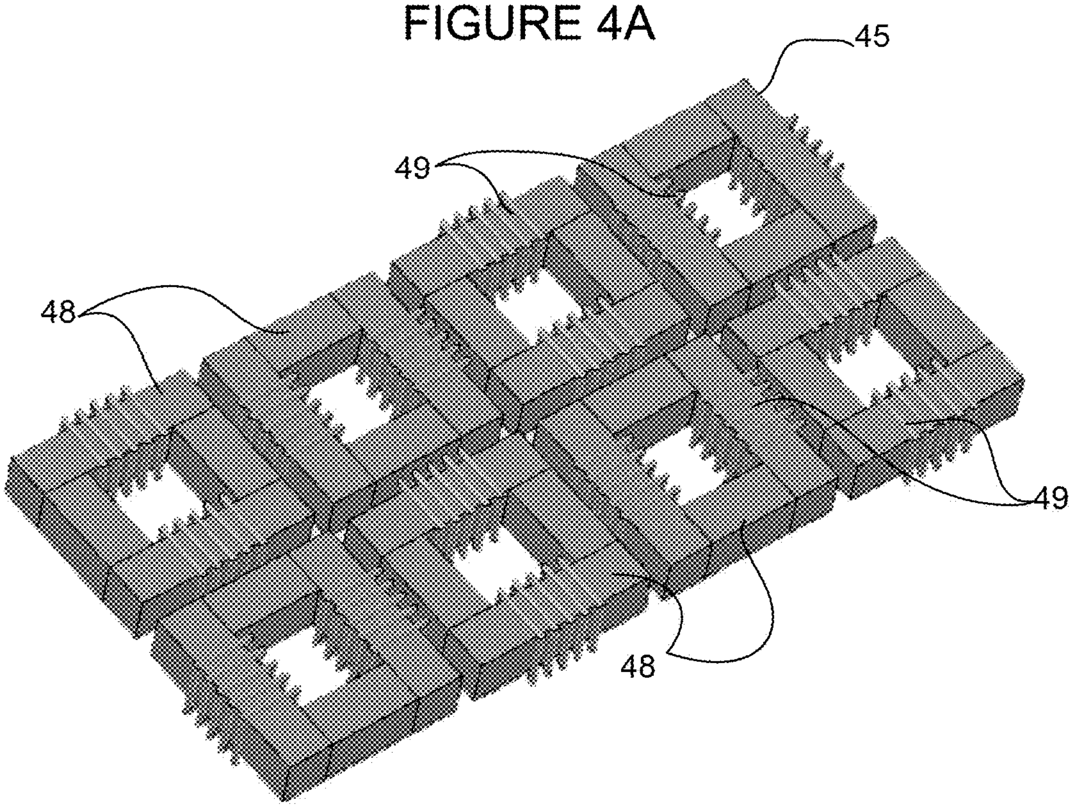
FIG. 4B is a perspective of a transformer and common mode choke array with square cores for use in the LAN magnetics module of FIG. 3.

FIG. 4B shows an array 45 comprising rectangular (square) cores 48. As previously described, windings 49 are located on opposite sides of each core 48, with the cores positioned such that the windings are generally orthogonal to one another on adjacent cores. Thus, a side of the core 48 containing one of the pair of windings 49 is positioned adjacent to a side of a core that contains no windings.

In one example, the magnetic core 18, 28, 38, 48 has a diameter (toroidal core) or width and height (square core) of approximately 4 mm and a height of approximately 2.45 mm. It is to be understood that this is only an example and that the core may be any suitable size or shape to fit within the ICM or LAN magnetics module. Also the array 15, 25, 35, 45 may contain any number, arrangement, or type of core and winding assemblies.

Figure 2B:
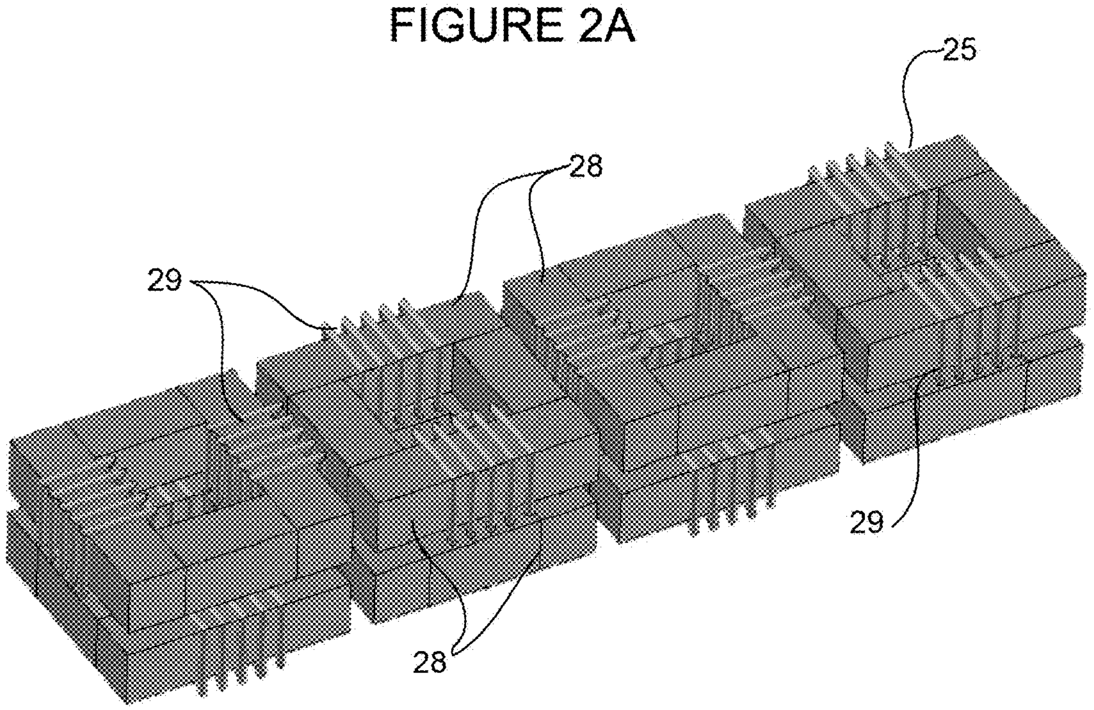
FIG. 2B is a perspective of a transformer and common mode choke array with square cores for use in the integrated connector module of FIG. 1.

The square cores 28, 48 shown in FIGS. 2B and 4B help to maintain the windings 29, 49 in their original orthogonal position within the array 25, 45 since the windings are unlikely to migrate over corners of the rectangular core. However, for the toroidal core 18, 38 of FIGS. 2A and 4A, the coils 19, 39 may not stay in their original targeted area of the core with each of the windings generally opposite one another on the core. In order to provide consistency in the position of the windings within the array 15, 35, a notched magnetic core may be used, as shown in FIGS. 5A and 5B.

Figure 5A:
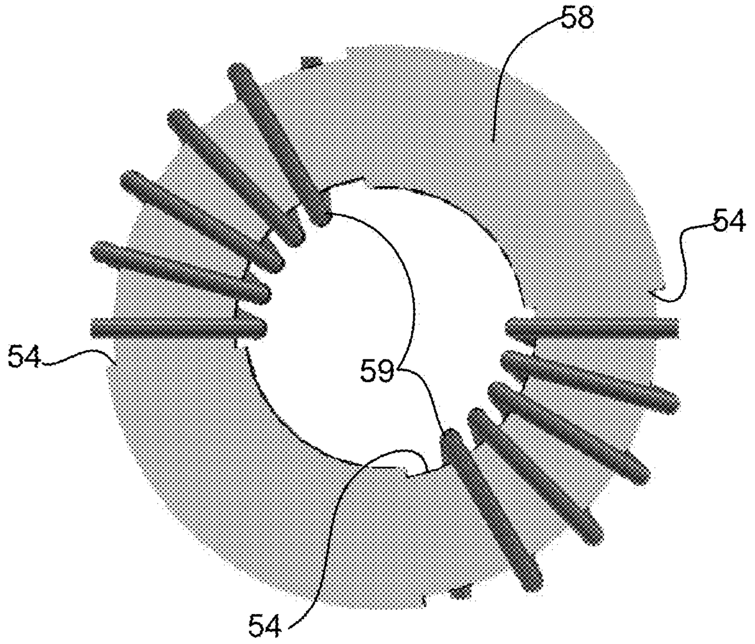
FIG. 5A is a top view of a toroidal core with winding retaining grooves for maintaining a position of windings in the transformer and common mode choke array, in accordance with one embodiment.
Figure 5B:
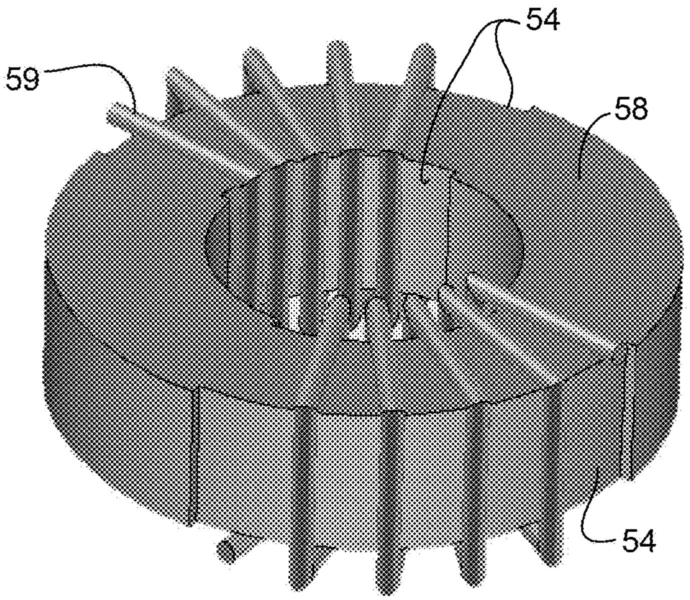
FIG. 5B is a perspective of the toroidal core with the winding retaining grooves shown in FIG. 5A.

FIGS. 5A and 5B show a top view and a perspective view, respectively, of a core 58 and pair of windings 59 of a transformer or common mode choke, in accordance with one embodiment. In this example, the core 58 comprises retaining grooves (notches, slots) 54, which help to maintain the windings 59 in a position generally diametrically opposed from one another on the core. The windings 59 are located within the retaining groove 54 to provide a consistent winding location so that the windings will remain biorthogonal to windings on adjacent toroidal cores. These discrete alignment grooves 54 ensure core-to-core winding repeatability. In the example shown in FIGS. 5A and 5B, the retaining groove 54 comprises a necked down portion extending circumferentially over two angular portions of the core.

It is to be understood that the retaining groove shown in FIGS. 5A and 5B and described above is only an example and that other retaining means may be used without departing from the scope of the embodiments. For example, the retaining groove may be located only on an inner surface or outer surface of the core or may comprise a pair of raised tabs or recessed slots or notches, which help to maintain the windings 59 within their specified angular target area on the core 58. The grooves 54 may be, for example, angled to facilitate winding operations in addition to other alignment benefits.

It is to be understood that the connector assembly, LAN magnetics, and transformer and common mode choke arrays shown in FIGS. 1, 2A, 2B, 3, 4A, and 4B and described herein are only examples and that other port, plug, cable, or connector configurations, including those covered by different standards or codes, may be used or different configuration arrays (number of components, arrangement of rows, stacks) may be used without departing from the scope of the embodiments. For example, the connector may comprise any number of ports and may be configured for operation with PoE (Power over Ethernet). The embodiments may be used with various types of connectors used within the telecommunications industry, such as registered jacks RJ45 type connectors, or any other type of connectors, plugs, interfaces, or adapters used in the telecommunications industry, computer industry, automotive industry, or other industries.

Figure 6A:
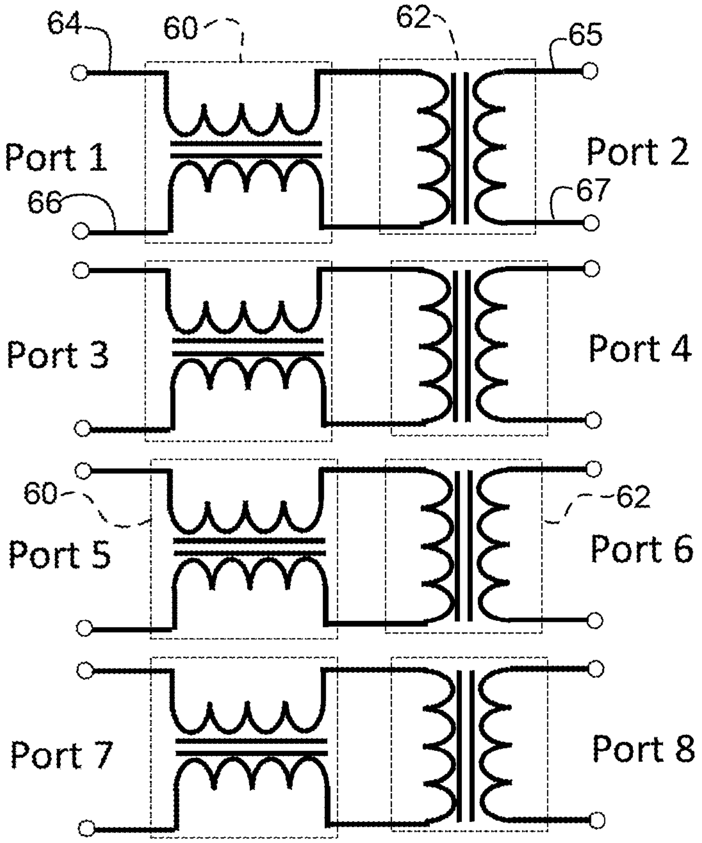
FIG. 6A is an electrical schematic of the transformer and common mode choke array, in accordance with one embodiment.

FIG. 6A shows an example schematic for an eight port connector with common mode chokes 60 and transformers 62. A pair of traces (positive signal wire 64 and negative signal wire 66) at Port 1 goes through common mode choke 60 and passes through transformer 62. The common mode choke 60 is connected between a line side of the port and one of the windings of the transformer 62. One winding of the transformer 62 is connectable on the network via the connector with the other winding connected to the common mode choke 60. Referring to Port 2, for example, one end 65 of the coil of the transformer 62 is electrically connected to a first terminal of Port 2 and another end 67 is electrically connected to a second terminal of Port 2. In conventional systems in which all of the windings are close to each other (i.e., winding extending over a majority of the core and positioned adjacent to one another in array), capacitance between the coils (e.g., between wires 64 and 65 and between adjacent wires between Port 1 and Port 3, Port 2 and Port 4, etc.) is larger than with the biorthogonal windings described herein, which leads to worse common mode noise rejection and crosstalk.

Figure 6B:
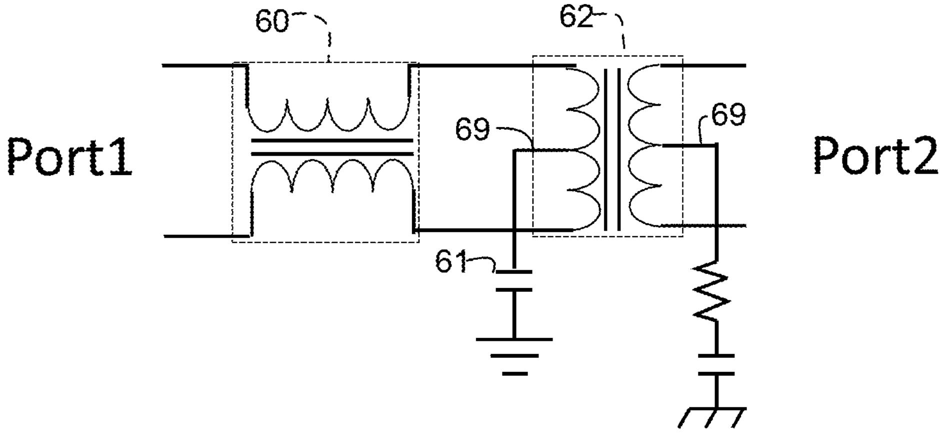
FIG. 6B is an electrical schematic for a portion of the transformer and common mode choke array with a center tap with common mode termination.

In one embodiment, a center tap 69 may be provided at the transformer 62 with common mode termination as shown in FIG. 6B. In the example shown in FIG. 6B, the termination network is connected to the transformer through capacitor 61. The center tap 69 may provide extra common mode noise rejection at higher frequencies (e.g., 3-5 dB improvement above 100 MHz, 20 dB improvement below 100 MHz).

Figure 7A:
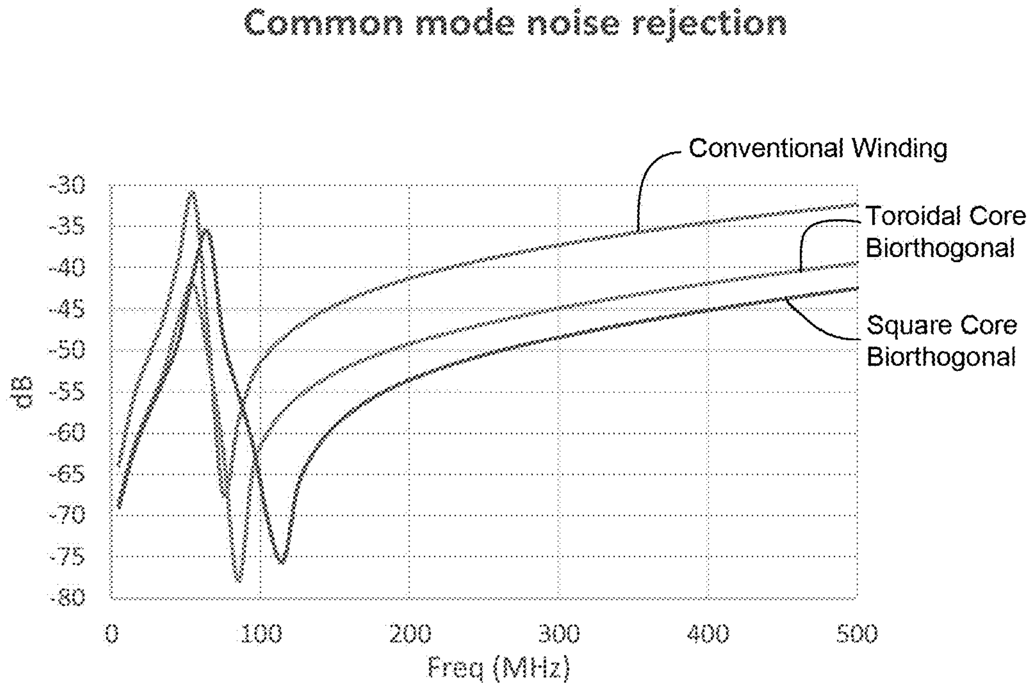
FIG. 7A is a graph illustrating improved common mode noise rejection with biorthogonal windings.
Figure 7B:
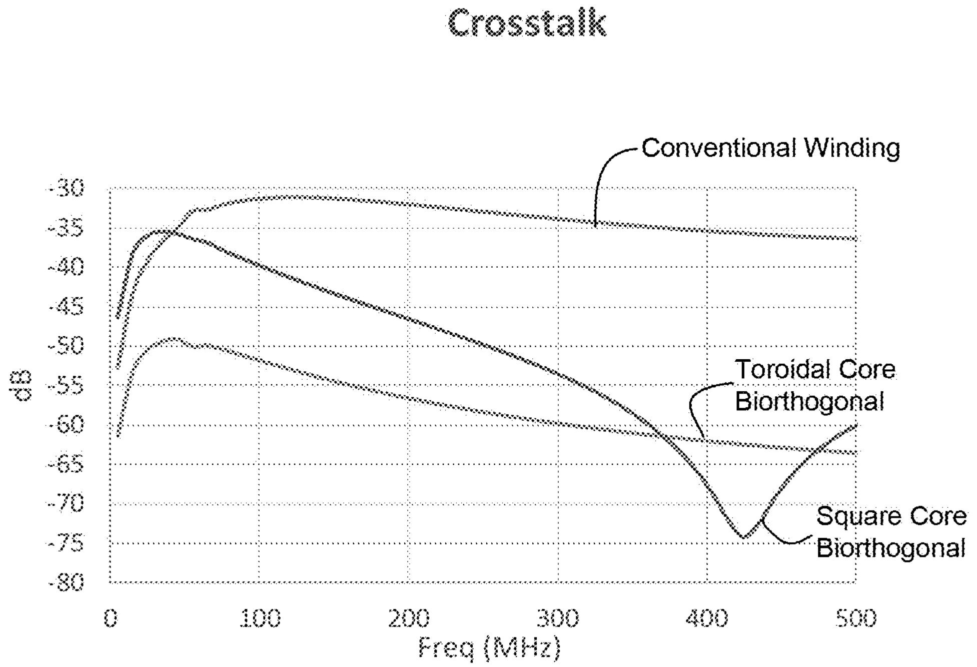
FIG. 7B is a graph illustrating reduced crosstalk with the biorthogonal windings.

As shown in the example simulations of FIGS. 7A and 7B, the biorthogonal windings provide improved common mode noise rejection and crosstalk performance over conventional systems without biorthogonal windings. In this example, the biorthogonal winding embodiments provide almost 5-10 dB improvement over conventional system in all frequencies in common mode noise rejection (FIG. 7A). With regard to crosstalk shown in FIG. 7B, the biorthogonal winding embodiments provide an improvement of around 10-30 dB above frequencies of 100 MHz, as compared with conventional systems.

The embodiments described herein may operate in the context of a data communications network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet, intranet, radio access network, public switched network, or any other network).

Figure 8:
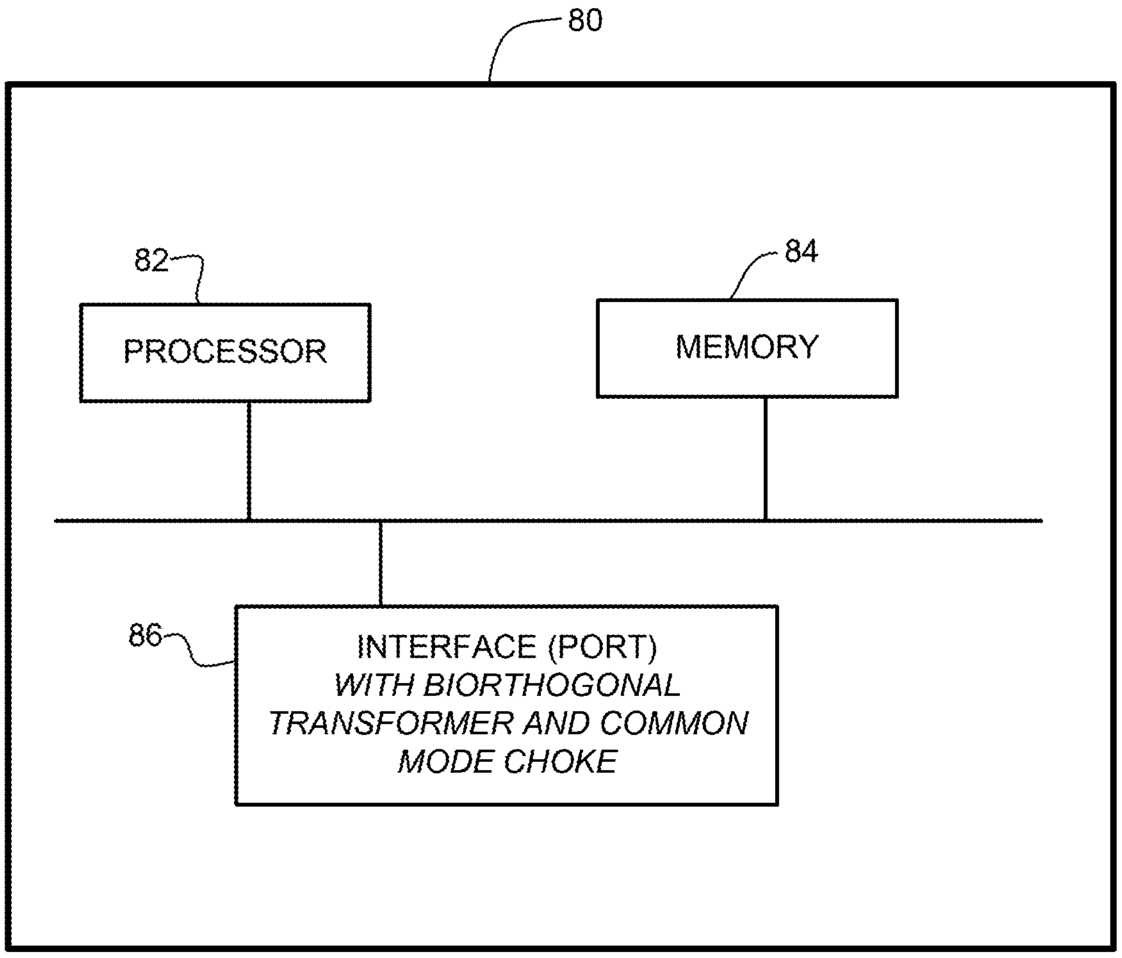
FIG. 8 is a block diagram depicting an example of a network device on which a port comprising the embodiments described herein may be located.

FIG. 8 illustrates an example of a network device 80 that may implement the embodiments described herein. In one embodiment, the network device 80 is a programmable machine that may be implemented in hardware, software, or any combination thereof. The network device 80 includes one or more processor 82, memory 84, and network interface (port) 86 comprising the transformer and common mode choke array described herein.

Memory 84 may be a volatile memory or non-volatile storage, which stores various applications, operating systems, modules, and data for execution and use by the processor 82. The network device 80 may include any number of memory components.

Logic may be encoded in one or more tangible media for execution by the processor 82. For example, the processor 82 may execute codes stored in a computer-readable medium such as memory 84. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The processor 82 may process data received from the connector (port) 86. The network device 80 may include any number of processors 82.

The network interface 86 may comprise any number of interfaces (linecards, ports) for receiving data or transmitting data to other devices. The network interface 86 may include, for example, an Ethernet interface for connection to a computer or network. As described above, the interface 86 may comprise one or more connectors configured to receive one or more plugs. The term "connector" as used herein may refer to an ICM as shown in FIG. 1 or a device comprising a separate LAN magnetics module as shown in FIG. 3.

It is to be understood that the network device 80 shown in FIG. 8 and described above is only an example and that different configurations of network devices may be used. For example, the network device 80 may further include any suitable combination of hardware, software, algorithms, processors, devices, components, or elements operable to facilitate the capabilities described herein.

Although an apparatus has been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:

a plurality of transformers; and a plurality of common mode chokes, each of the transformers and the common mode chokes comprising a magnetic core and windings wound around the magnetic core at generally opposite sides thereof such that the windings contact an inner side and an outer side of the magnetic core;

wherein said plurality of transformers and said plurality of common mode chokes are arranged in an array with the windings on each magnetic core positioned offset by approximately 90 degrees from a position of the windings of adjacent magnetic cores in a same plane of the array to reduce crosstalk and improve common mode noise rejection, wherein the apparatus comprises a LAN (Local Area Network) magnetics module, and wherein the magnetic core comprises a single pair of grooves disposed on opposing sides to retain the windings in their offset position relative to the windings on the adjacent magnetic cores in the array.

2. The apparatus of claim 1 wherein the array comprises at least two vertically stacked rows of said plurality of transformers and said plurality of common mode chokes and wherein the windings are offset for the magnetic cores located adjacent in the same plane and stacked adjacent to one another in different of said stacked rows.

3. The apparatus of claim 1 wherein the apparatus is configured for operation in a network port for a network communications device.

4. The apparatus of claim 1 wherein the magnetic core comprises a toroidal core.

5. The apparatus of claim 4 wherein the grooves are diametrically opposed grooves to retain the windings in their offset position relative to the windings on the adjacent magnetic cores in the array.

6. The apparatus of claim 5 wherein the grooves extend circumferentially around a portion of the magnetic core on which the windings are wound.

7. The apparatus of claim 5 wherein each of the grooves extend over an angular section of the magnetic core of less than ninety degrees.

8. The apparatus of claim 1 wherein the array of said plurality of transformers and said plurality of common mode chokes define at least four signal pairs in an eight port connector.

9. The apparatus of claim 1 wherein the windings comprise a primary coil and a secondary coil.

10. An apparatus comprising:

an array of transformers and common mode chokes each comprising a magnetic core and windings wound around the magnetic core at opposing locations on the magnetic core such that the windings contact an inner side and an, opposing outer side of the magnetic core; and a single pair of retaining grooves disposed on opposing sides on each magnetic core to maintain the windings in their opposing locations on the magnetic core;

wherein the transformers and common mode chokes are positioned in a same plane of the array with the windings on each magnetic core located offset by approximately 90 degrees to the windings of adjacent magnetic cores in the array to reduce crosstalk and improve common mode noise rejection.

11. The apparatus of claim 10 wherein the apparatus comprises a LAN (Local Area Network) magnetics module.

12. The apparatus of claim 10 wherein the retaining grooves extend circumferentially around a portion of the magnetic core on which primary and secondary coils are wound.

13. The apparatus of claim 10 wherein each of the retaining grooves extends over an angular portion of the magnetic core of less than ninety degrees.

14. An apparatus comprising:

a connector for receiving a plurality of network communications cables, the connector comprising:

a plurality of transformers; and a plurality of common mode chokes, each of the transformers and the common mode chokes comprising a magnetic core and windings wound around the magnetic core at generally opposite sides thereof such that the windings contact an inner side and an, opposing, outer side of the magnetic core; and a processor for processing data received from the connector;

wherein said plurality of transformers and said plurality of common mode chokes are arranged in a same plane of an array with the windings on each magnetic core positioned offset by approximately 90 degrees from a position of the windings of adjacent magnetic cores to reduce electromagnetic interference in the array, wherein the magnetic core further comprises a single pair of diametrically opposed retaining grooves to retain the windings in their offset position relative to the windings on the magnetic adjacent cores.

15. The apparatus of claim 14 wherein the retaining grooves extend circumferentially around a portion of the magnetic core on which the windings are wound.

16. The apparatus of claim 14 wherein each of the retaining grooves extends over an angular portion of the magnetic core of less than ninety degrees.

17. The apparatus of claim 10 wherein the magnetic core comprises a toroidal core.

18. The apparatus of claim 10 wherein the array of said plurality of transformers and said plurality of common mode chokes define at least four signal pairs in an eight port connector.

19. The apparatus of claim 14 wherein said plurality of transformers and said plurality of common mode chokes comprises at least two vertically stacked rows of said plurality of transformers and said plurality of common mode chokes and wherein the windings are offset for the magnetic cores located adjacent in the same plane and stacked adjacent to one another in different of said stacked rows.

20. The apparatus of claim 14 wherein said plurality of transformers and said plurality of common mode chokes define at least four signal pairs in an eight port connector.

* * * * *